(12) United States Patent
Stütz et al.

(10) Patent No.: US 6,224,087 B1
(45) Date of Patent: May 1, 2001

(54) SIDE IMPACT PROTECTIVE DEVICE FOR VEHICLE OCCUPANTS

(75) Inventors: Michael Stütz, Spraitbach; Heinz Eyrainer, Waldstetten, both of (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/258,587

(22) Filed: Feb. 26, 1999

Related U.S. Application Data

(63) Continuation-in-part of application No. 08/800,262, filed on Feb. 13, 1997, now abandoned.

(30) Foreign Application Priority Data

Feb. 23, 1996 (DE) ............................................... 296 03 316

(51) Int. Cl.[7] ............................ B60R 21/20; B60R 21/22
(52) U.S. Cl. ..................................... 280/728.2; 280/730.2
(58) Field of Search ............................. 280/728.2, 730, 280/2, 730.1, 743.1, 728.3, 732, 736, 740, 741, 728.1, 729, 743.2

(56) References Cited

U.S. PATENT DOCUMENTS

| | | | |
|---|---|---|---|
| 4,911,471 | * | 3/1990 | Hirabayashi ........................ 280/732 |
| 5,062,664 | * | 11/1991 | Bishop et al. ..................... 280/728.2 |
| 5,480,181 | * | 1/1996 | Bark et al. ......................... 280/730.2 |
| 5,536,041 | * | 7/1996 | Acker et al. ........................ 280/740 |
| 5,540,459 | * | 7/1996 | Daniel ............................... 280/730.2 |
| 5,755,457 | * | 5/1998 | Specht ............................... 280/728.2 |
| 5,884,937 | * | 3/1999 | Yamada ............................. 280/730.2 |
| 5,899,486 | * | 5/1999 | Ibe ..................................... 280/728.2 |
| 5,899,489 | * | 5/1999 | Jost .................................... 280/730.2 |
| 5,921,575 | * | 7/1999 | Kretschmer et al. ............. 280/728.2 |

FOREIGN PATENT DOCUMENTS

| | | |
|---|---|---|
| 2249988A | 4/1974 | (DE) . |
| 3422263C2 | 2/1988 | (DE) . |
| 1381999 | 1/1975 | (GB) . |
| 2191450 | * 12/1987 | (GB) . |
| 2261636 | * 5/1993 | (GB) . |
| 3-276844 | * 12/1991 | (JP) . |

* cited by examiner

*Primary Examiner*—Peter C. English
(74) *Attorney, Agent, or Firm*—Tarolli, Sundheim, Covell, Tummino & Szabo L.L.P.

(57) ABSTRACT

A side impact protective device for vehicle occupants is arranged along a roof frame of a vehicle and includes a cladding part for covering the roof frame, a head gas bag and mounting members. The head gas bag is convertible from a folded state to an unfolded state and has, in its unfolded state, an upper part with two outer end portions. The head gas bag is arranged underneath the cladding part in the folded state extended in a longitudinal direction substantially parallel to the roof frame and only folded in a direction transversely to the longitudinal direction. The mounting members serve to attach the head gas bag at least at the outer end portions to the roof frame.

24 Claims, 4 Drawing Sheets

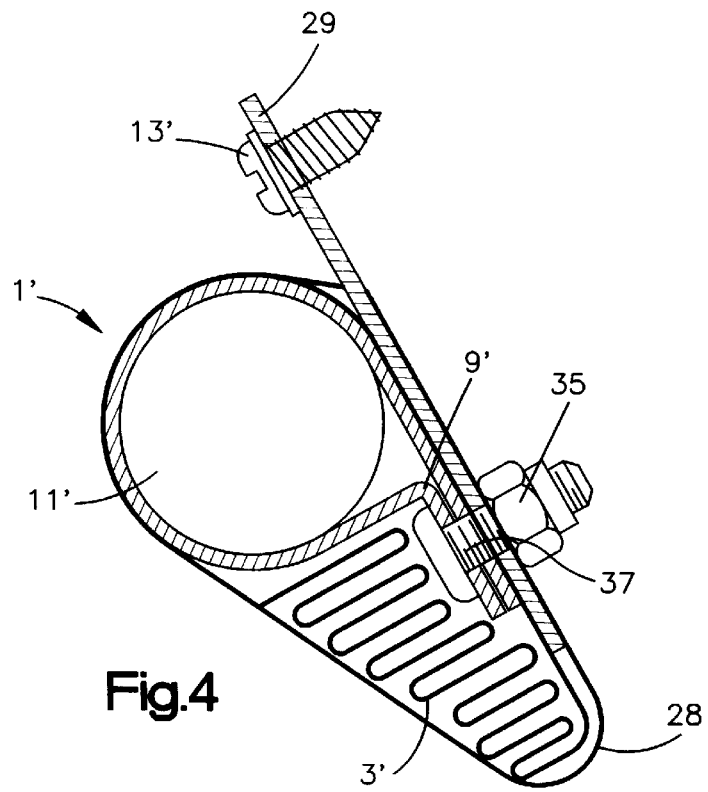
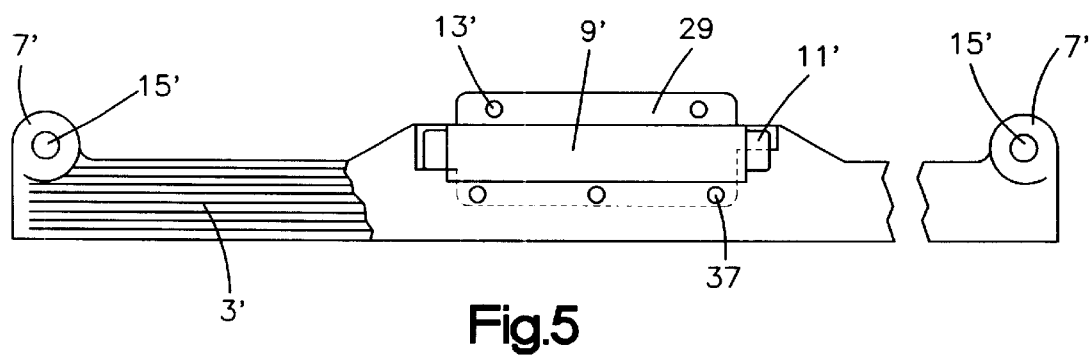

SIDE IMPACT PROTECTIVE DEVICE FOR VEHICLE OCCUPANTS

This application is a continuation-in-part of application application Ser. No. 08/800,262 filed on Feb. 13, 1997, now abandoned.

FIELD OF THE INVENTION

The present invention relates to a side impact protective device for vehicle occupants.

BACKGROUND OF THE INVENTION

A side impact protective device is disclosed in the German patent publication 3,422,263 C2. The device comprises a gas-filled supply container for the inflation of the head gas bag which is arranged in a longitudinal beam of the vehicle, i.e., in the door sill region and is connected by a duct with a head gas bag. In an accident the folded gas bag arranged underneath the cladding part on the roof frame either bursts open the cladding part or deforms it and upon inflation deploys to the side of an occupant between his head and the side window. The position of the inflated head gas bag and its direction of deployment are however not completely regular and controlled, something possibly leading to a delay in the inflation step and to safety risks, if the gas bag is not exactly arranged to the side of the head of such vehicle occupant or if during a side impact it can shift in relation to the head of the occupant.

The German patent publication 2,249,988 A discloses a side impact protective device comprising an inflatable head gas bag which together with a pressurized gas container is secured in a recess in a cladding part on the roof frame so that the cladding part does not surround the folded head gas bag and the bag is likely to be accidentally or otherwise damaged by same. Furthermore, the container extends along the entire length of the head gas bag and is made correspondingly large in size, which makes it more difficult to accommodate the gas bag in the vehicle.

SUMMARY OF THE INVENTION

The invention provides a side impact protective device with which the position of the head gas bag both in the deployed state and in the course of inflation itself is consistently controlled.

The side impact protective device according to the invention is arranged along a roof frame of a vehicle and includes a cladding part for covering the roof frame, a head gas bag and mounting means. The head gas bag is convertible from a folded state to an unfolded state and has, in its unfolded state, an upper part with two outer end portions. The head gas bag is arranged underneath the cladding part in the folded state extended in a longitudinal direction substantially parallel to the roof frame and only folded in a direction transversely to the longitudinal direction. The mounting means serve to attach the head gas bag at least at the outer end portions to the roof frame.

The head gas bag is accordingly arranged in a predetermined manner even in its unfolded condition for its full longitudinal extent in the vehicle, since it is not folded in the longitudinal direction. The unfolding operation must consequently take place principally only in the vertical direction and in the direction toward the head of the vehicle occupant. It is hence possible to avoid disordered unfolding. Furthermore, the position of the head gas bag is consequently defined and regular in the inflated state as well so that displacement of the head gas bag in relation to the vehicle may not occur with the side crash protective device of the invention.

In accordance with a preferred embodiment the head gas bag is provided on its ends attached to the roof frame with attachment eyes to facilitate fitting to the roof frame. Thus it is only necessary to provide hooks or screws on the roof frame.

In accordance with a further embodiment an associated elongated gas generator is arranged parallel to the folded head gas bag underneath the cladding part so that long gas ducting means as in the said German patent publication 3,422,263 C2 are not required.

The gas generator may have a cylindrical outline and may have gas outlet openings on its external peripheral surface with the result that there is a rapid inflation operation.

It is preferred for the gas generator to extend in the longitudinal direction of the folded head gas bag along the middle third of the head gas bag at the most to increase the compactness of the protective device of the invention.

The protective device of the invention is, in accordance with a preferred embodiment, adapted to be attached on the roof frame using a mounting plate on which the gas generator and the head gas bag are pre-mounted. This means that the protective device can be supplied as a completely pre-mounted module able to be rapidly installed in a vehicle.

If the gas generator is mounted in the interior of the head gas bag, the attachment of the gas generator to the head gas bag is simplified.

Furthermore, the mounting plate may be arranged in the interior of the head gas bag. Preferably at least one part of a screw/nut connection for attachment of the side impact protective device is fixed to the mounting plate in a non-rotatable fashion. An opening must be present at the associated point in the head gas bag through which the shank of a screw may extend. If a screw is welded to the mounting plate, for instance at its head, then the screw shank will extend through the opening in the gas bag to the outside, where the mating nut may be screwed on for attachment of the side impact protective device. If on the contrary a nut is secured to the mounting plate, it is then possible to drive a screw from the outside into the nut.

Furthermore, it is in some circumstances dependent on vehicle geometry an advantage to provide an adapter plate outside of the head gas bag, the adapter plate being able to be connected with the mounting plate and, furthermore, to be locked on the roof frame. Assembly is simplified by the adapter plate, for it can extend to readily accessible parts in the roof frame part.

A particularly simple and secure attachment of the gas generator on the mounting plate is achieved in accordance with an advantageous embodiment if the mounting plate is designed in the form of a clip and engages around the gas generator. The diameter of the clip-like mounting plate is reduced by a clamping means, such means serving at the same time as the means for the attachment of the mounting plate so that there is a saving in parts.

The mounting plate may, furthermore, naturally also be arranged outside the head gas bag.

In order to hold the head gas bag during shipping in its folded condition, the same and the gas generator are pre-mounted on the mounting plate with the aid of a foil surrounding them or of a plastic tube.

If in accordance with a further preferred embodiment the cladding part is a door which is opened by the unfolding of the head gas bag and which is defined, as a possible measure, by intentional points of weakness in the cladding part, the unfolding operation will take place more rapidly and the direction of unfolding will be under full control, since the head gas bag will not have to provide any great forces for deformation of parts.

The door can contribute to setting and holding of the direction of unfolding of the head gas bag, if it is provided with a means for limiting its maximum opening angle, such means for instance comprise a tethering tape attached on the one hand to the door and on the other hand to the roof frame.

The geometry of the door and its maximum opening angle are preferably so adapted to the head gas bag that the door steers the unfolding direction of the gas bag to be oblique in relation to the side window and the head gas bag assumes a position in front of the side window.

Moreover, in accordance with a further embodiment, the cladding part is so attached to the roof frame that the head gas bag may move into a position between the cladding part and the roof frame during unfolding so that a fish mouth-like opening results.

BRIEF DESCRIPTION OF THE DRAWINGS

The foregoing and other features of the present invention will become apparent to those skilled in the art to which the present invention relates upon reading the following description with reference to the accompanying drawings, wherein:

FIG. 4 shows a cross sectional view of a side impact protective device in accordance with a second embodiment in the unmounted condition.

FIG. 5 shows a longitudinal view of the side impact protective device in accordance with FIG. 4.

DESCRIPTION OF PREFERRED EMBODIMENT

Figure 1:
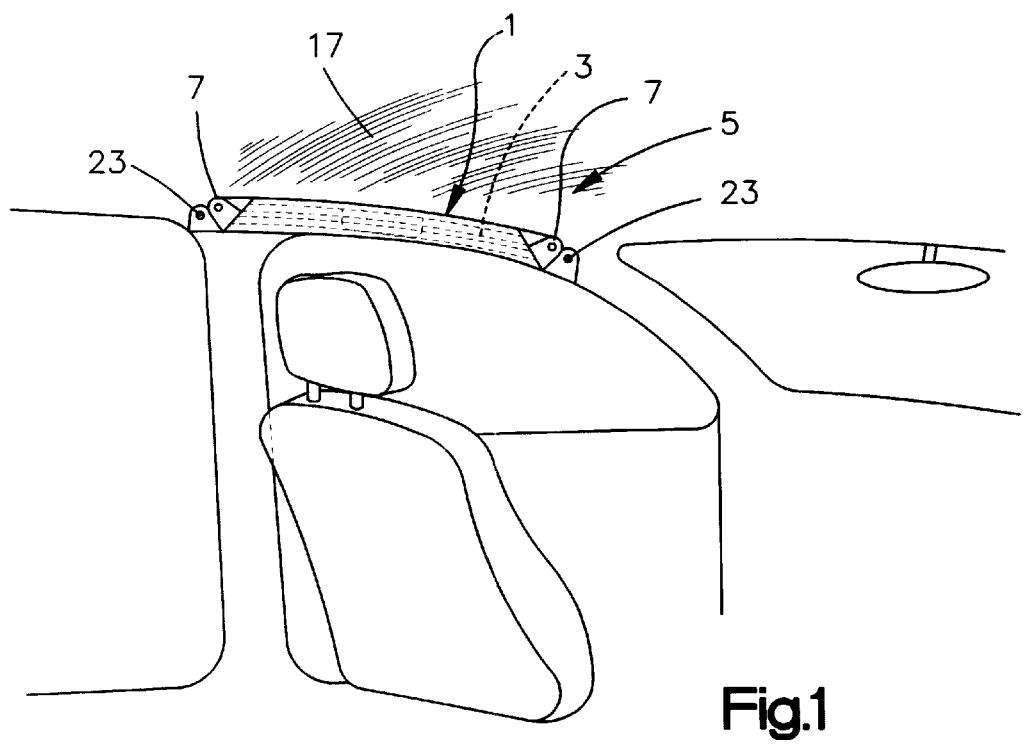
FIG. 1 shows the side impact protective device in accordance with the invention with the head gas bag not yet unfolded.
Figure 2:
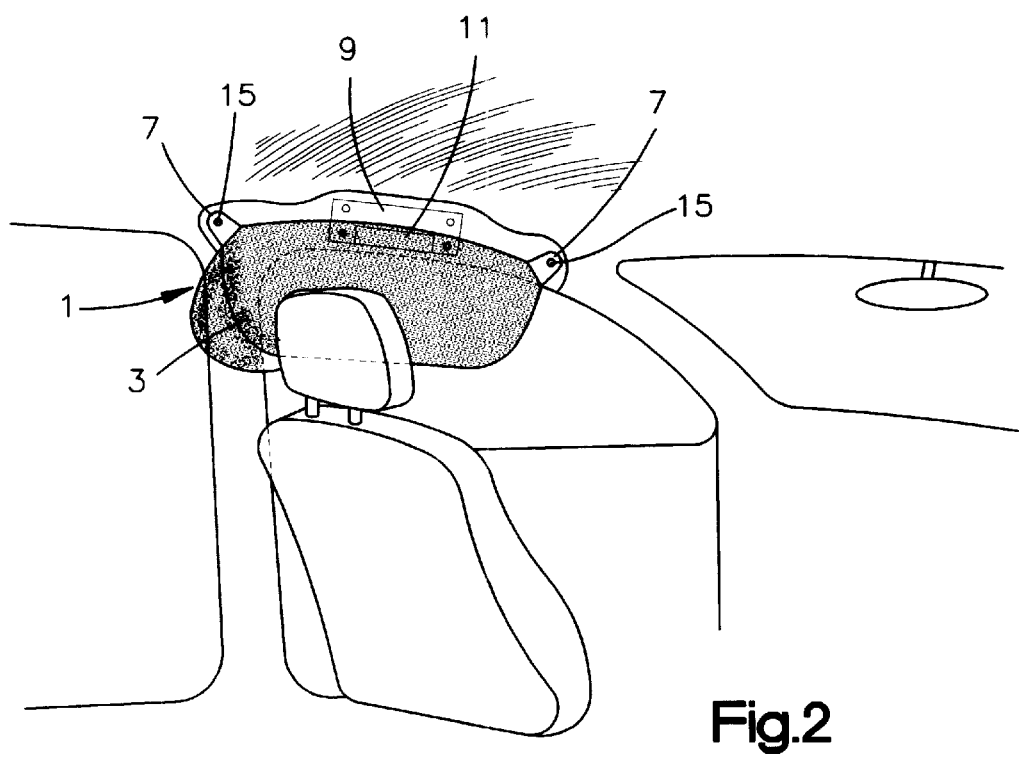
FIG. 2 shows the side impact protective device in accordance with FIG. 1 with the head gas bag unfolded.

In FIG. 1, a side impact protective device 1 is illustrated having a head gas bag 3 folded only in a longitudinally elongated or extended manner, said head gas bag being attached to a roof frame 5 of a vehicle above the door opening underneath a cladding part 17 which represents the ceiling of the vehicle interior. In order to render the drawing more clear, the cladding part 17 is shown as being omitted in FIGS. 1 and 2 adjacent to the side impact protective device 1. The folded head gas bag 3 extends from the A column of the vehicle to the B column thereof and is secured at two points to the roof frame 5, such points being at its two outer end portions 7 which are at the top in the unfolded condition, as is best seen in FIG. 2. At such points, the head gas bag 3 has ears with attachment eyes through which there extend screws 15 illustrated in FIG. 2, said screws being able to be screwed into the roof frame 5. A gas generator 11 extends in the longitudinal direction of the folded head gas bag 3 along approximately the middle third of the head gas bag 3 and is secured to the roof frame with the aid of a mounting plate 9, as is clearly illustrated in FIG. 3.

Figure 3:
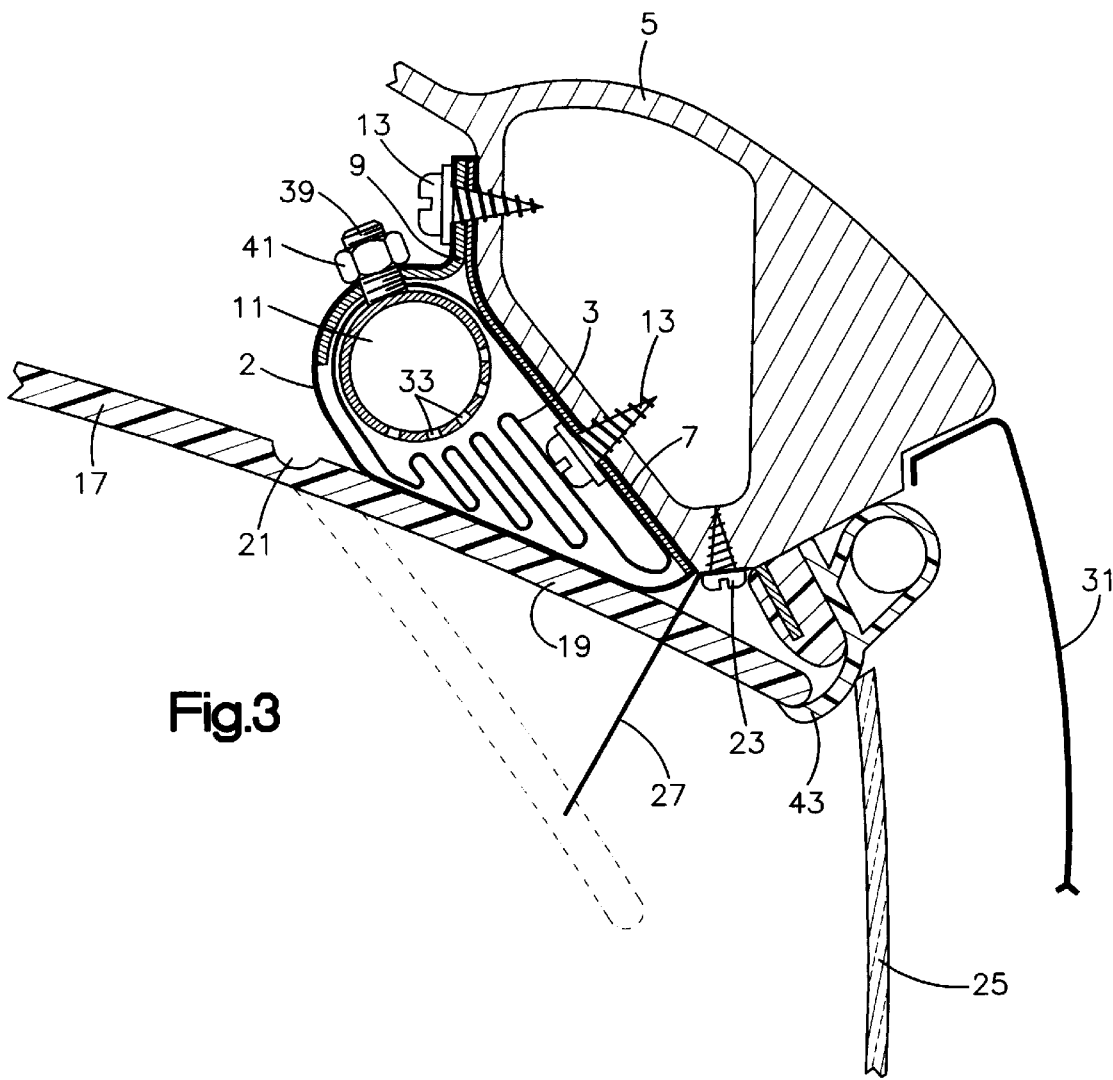
FIG. 3 shows a cross sectional view taken through the side impact protective device of FIG. 1 in accordance with a first embodiment.

As shown in FIG. 3, the gas generator 11 which is arranged in the interior of the head gas bag 3 has a cylindrical outline with numerous gas outlet openings 33 distributed over its outer peripheral surface, such openings being directed toward a folded region of the head gas bag 3. A male threaded stud 39 molded on the peripheral surface extends right through an opening in the head gas bag 3 to the outside and, furthermore, through an opening in a Y-shaped mounting plate 9. A web of the mounting plate 9 to which the gas generator 11 is attached by its stud 39 and a nut 41 is adapted in its form to the outline of the gas generator 11 and surrounds same partly so that the gas generator 11 is thrust against the web of the mounting plate 9 on screwing up the nut 41 tight with the result that the opening in the head gas bag 3 is sealed off adjacent to the stud 39 in order to prevent escape of gas. openings are also provided in the other web of the Y-shaped mounting plate 9 through which screws 13 extend for the attachment of the side impact protective device 1 on the roof frame 5. The side impact protective device 1 may be simply screwed on the roof frame 5 as a completely pre-assembled unit, such pre-assembly being performed on the one hand by using the studs 39 and on the other hand by using a foil 2 surrounding the mounting plate 9, the folded head gas bag 3 and the gas generator 11. The cladding part 17 underneath which the side impact protective device 1 is arranged without being visible from the outside is partially designed in the form of a door 19 or flap which is able to be opened by the unfolding of the head gas bag 3. The door 19 is defined by a U-like line of intentional weakness 21 in the cladding part 17. The edge of the door 19 which is pointed toward a vehicle door 31 is latched in a rail-like holding part 43 secured to the roof frame 5. A device for limiting the maximum angle of opening of the door 19 in the form of a tether tape 27 is on the one hand secured to the door 19 and on the other hand by means of screws 23 to the roof frame 5. The opened door 19 is indicated in FIG. 3 in chained lines.

FIG. 4 shows a second embodiment of the side impact protective device 1', adapted to be pre-mounted as a complete unit, in the case of which the mounting plate 9' as well is also arranged within the head gas bag 3' since it extends like a clip about the gas generator 11'. A screw/nut connection, comprising a screw 37 and a nut 35, serves on the one hand as a means for the attachment of the mounting plate 9' on an adapter plate 29 located outside the head gas bag 3', and on the other hand as a means for clamping the clip-like formed mounting plate 9'. For this purpose, the head of the screw 37 is welded to the mounting plate 9'. An associated screw shank extends right through an opening in the mounting plate 9' and in the head gas bag 3' to the outside and further through an opening in the adapter plate 29. The mounting plate 9' together with head gas bag 3' is thrust against the adapter plate 29 by means of the nut 35 and fixed on the plate 29 with the result that the opening in the head gas bag 3' does not permit any escape of gas therethrough. The adapter plate 29 and accordingly the entire side impact protective device 1' is able to be screwed to the roof frame 5 by means of the screws 13'. In order to improve fitting and for facilitating shipping, a thin, slotted plastic tube 28 surrounds the folded head gas bag 3' and accordingly the gas generator 11' and partially also the adapter plate 29.

FIG. 5 shows the head gas bag 3' with partial sectioning at the mounting plate 9' and at the gas generator 11'. In this case, it will be seen that the mounting plate 9' and, furthermore, the adapter plate 29 do not extend laterally as far as the top end portions 7' of the head gas bag 3', but only as far as the side ends of the gas generator 11'.

The assembly of the side impact protective device 1, 1' as a complete module takes place quite simply using the two screws 13, 13' and by then driving the screws 15, 15' through the attachment eyes into the roof frame 5.

Since the head gas bag 3 is unfolded in the longitudinal direction, that is to say is already secured in and locked on the vehicle for its entire longitudinal extent, the position of the gas bag is stable in the unfolded state. Unfolding as such is commenced following a side impact by firing of the pyrotechnic material located in the gas generator 11 whereupon the gas will flow out of the gas generator 11 via the gas outlet openings 33 and will unfold the head gas bag 3, whereupon the door 19 will fly out of the holding part 43 and will fold so far toward the middle of the vehicle as is permitted by the tether tape 27. The geometry of the door 19 and the maximum opening angle thereof are so matched to the head gas bag 3 that the door 19 will steer the direction of unfolding of the head gas bag 3 obliquely toward a side window 25. Once the head gas bag 3 is completely unfolded, an intermediate space between the opened door 19 and the side window 25 will be occupied by the head gas bag 3. The head gas bag 3 will extend immediately adjacent to the side window 25 downwardly and is partially supported by the same. The head gas bag 3 itself can unfold principally only downwardly in the longitudinal direction and toward the head of a vehicle occupant owing to its fixed position in the longitudinal direction with the result that a rapid, fully controlled unfolding action will ensue. The door 19 is extremely narrow in design and will hardly project inward at all in its pivoted open setting in order not to present any danger to the head of the vehicle occupant.

Figure 6:
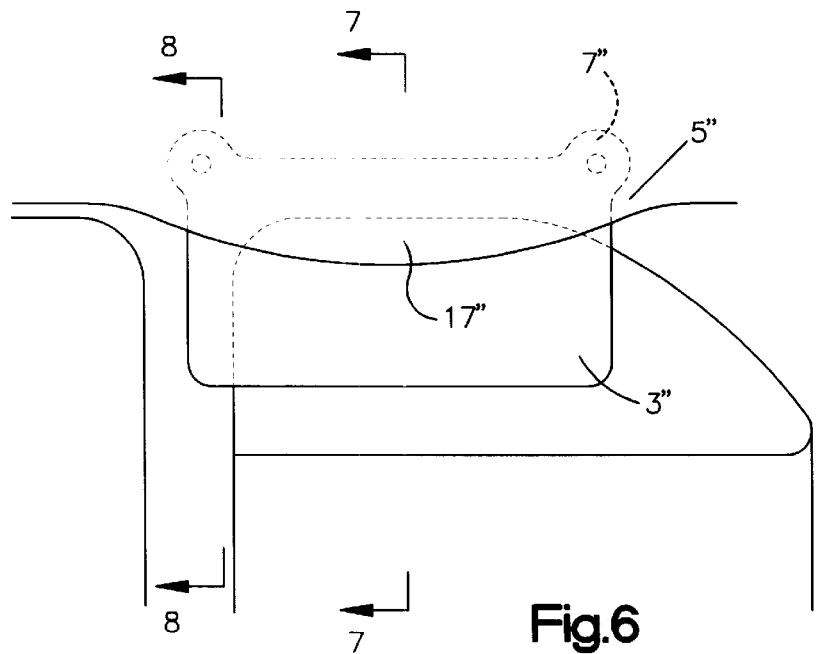
FIG. 6 is a side elevation of the side impact protective device of the invention in accordance with a further embodiment with the head gas bag unfolded.
Figures 7, 8:
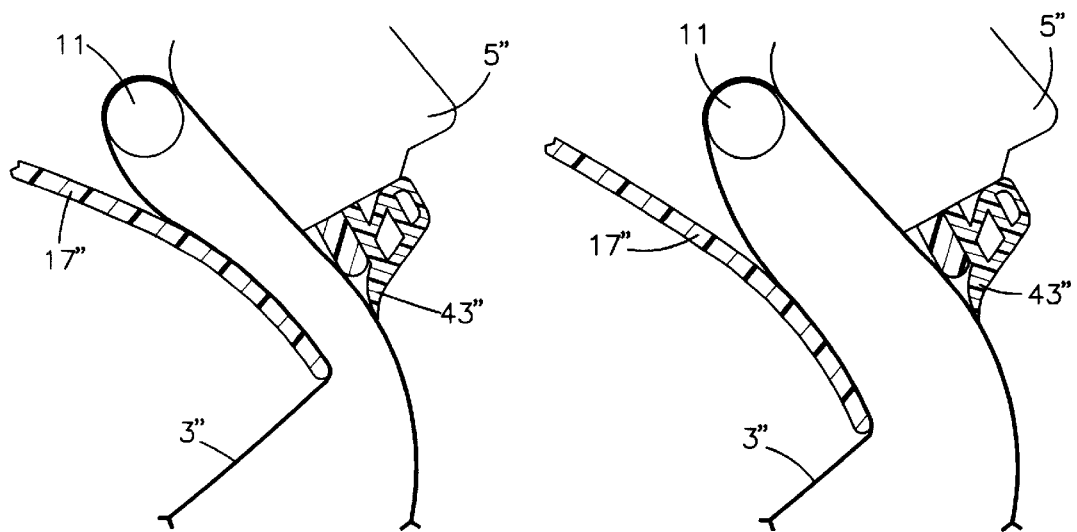
FIG. 7 is a cross sectional view of the side impact protective device taken on the line 7—7 in FIG. 6.
FIG. 8 is a cross sectional view of the side impact protective device taken on the line 8—8 in FIG. 6.

Instead of the door 19, the cladding part 17" may, as shown in FIGS. 6 through 8, be so secured to the roof frame 5" that the head gas bag 3" moves through between the same and the roof frame 5" in the course of unfolding and, accordingly, produces an aperture like the mouth of a fish. For this purpose, the cladding part 17" is secured to the roof frame 5" using the holding part 43". The cladding 17" comes clear of the holding part 43" as is illustrated in FIGS. 7 and 8 during unfolding of the head gas bag 3" and does, however, remain secured to the roof frame 5" by way of the holding part 43" in the part past the end portions 7". The cladding part 17" bulges somewhat inwardly so that a wider slot is produced in the middle of the head gas bag 3" through which the head gas bag 3" may slip. In the case of this embodiment, no additional tear-open means are required.

From the above description of the invention, those skilled in the art will perceive improvements, changes and modifications. Such improvements, changes and modifications within the skill of the art are intended to be covered by the appended claims.

Having described the invention, the following is claimed:

1. A side impact protective device for vehicle occupants, arranged along a roof frame of a vehicle, including a cladding part for covering said roof frame, a head gas bag convertible from a folded state to an unfolded state and having, in its unfolded state, an upper part with two outer end portions, said head gas bag being arranged underneath said cladding part in said folded state in which state said gas bag is extended in a longitudinal direction substantially parallel to said roof frame and folded in a direction transversely to said longitudinal direction and not folded in the longitudinal direction, and mounting means for attaching said head gas bag at least at said outer end portions to said roof frame.

2. The side impact protective device as claimed in claim 1, wherein said head gas bag is provided with attachment eyes at its end portions for attaching said head gas bag to said roof frame.

3. The side impact protective device as claimed in claim 1, further comprising a longitudinally extended gas generator which is arranged parallel to said head gas bag underneath said cladding part.

4. The side impact protective device as claimed in claim 3, further comprising a mounting plate secured to said roof frame by attachment means.

5. The side impact protective device as claimed in claim 4, wherein said head gas bag is mounted on said mounting plate.

6. The side impact protective device as claimed in claim 4, wherein said gas generator and said head gas bag are mounted on said mounting plate.

7. The side impact protective device as claimed in claim 6, wherein a foil is provided for mounting said gas generator and said head gas bag on said mounting plate by surrounding said gas generator and said head gas bag.

8. The side impact protective device as claimed in claim 4, wherein said gas generator is arranged in the interior of said head gas bag and said mounting plate is arranged in the interior of said head gas bag.

9. The side impact protective device as claimed in claim 8, wherein at least one screw/nut connection comprising a screw and a nut is provided, one of said screw and said nut being non-rotatably arranged on said mounting plate for the attachment of said side impact protective device, said head gas bag having an opening through which said screw extends.

10. The side impact protective device as claimed in claim 4, wherein an adapter plate is arranged outside said head gas bag connected with said mounting plate, said adapter plate being locked on said roof frame.

11. The side impact protective device as claimed in claim 4, wherein said mounting plate has the form of a clip and wherein said means for attachment of said mounting plate serve as means for clamping said mounting plate.

12. The side impact protective device as claimed in claim 4, wherein said mounting plate is arranged outside of said head gas bag.

13. The side impact protective device as claimed in claim 4, wherein a plastic tube is provided for mounting said head gas bag on said mounting plate by surrounding said head gas bag.

14. The side impact protective device as claimed in claim 13, wherein said plastic tube surrounds said gas generator and said head gas bag.

15. The side impact protective device as claimed in claim 1, wherein said cladding part has a door adjacent to said head gas bag adapted to open during unfolding of said head gas bag.

16. The side impact protective device as claimed in claim 15, wherein said cladding part comprises points of intentional weakness which define said door.

17. The side impact protective device as claimed in claim 16, further comprising means for limiting the maximum angle of opening of said door.

18. The side impact protective device as claimed in claim 17, wherein said means for limiting the maximum angle of opening of said door comprise at least one tether tape which on one end is secured to said door and on another end to said roof frame.

19. The side impact protective device as claimed in claim 17, wherein said head gas bag substantially unfolds in one direction and extends substantially parallel to a side window of said vehicle, the geometry of said door and said maximum angle of opening thereof are so adapted to said head gas bag that said door steers said direction of unfolding obliquely in relation to said side window.

20. The side impact protective device as claimed in claim 1, wherein said cladding part is so secured to said roof frame that said head gas bag may move into position between said cladding part and said roof frame during unfolding.

21. Method of assembling a side impact protective device for vehicle occupants, said device being attached to a roof frame of a vehicle and having a head gas bag for covering at least in part a side window of said vehicle in its inflated state, said head gas bag having a longitudinal direction which extends, in the mounted state of said device, parallel to said roof frame and an upper part with two outer end portions, wherein said method comprises the following steps:

a) said head gas bag is extended in said longitudinal direction;

b) said head gas bag is folded in a direction transversely to said longitudinal direction and not folded in the longitudinal direction so that said gas bag is extended in said longitudinal direction in its folded state; and c) at least said outer end portions of said head gas bag are attached to said roof frame by mounting means.

22. The method as claimed in claim 21, wherein said folded head gas bag is pre-mounted on a mounting plate for attaching said head gas bag to said roof frame, and said mounting plate together with said head gas bag define a unit which is attached to said roof frame.

23. The method as claimed in claim 22, wherein said mounting plate has the form of a clip and said clip is inserted into said head gas bag.

24. The method as claimed in claim 23, wherein an adapter plate is locked on said roof frame and said mounting plate is connected to said adapter plate to attach said device to the vehicle.

* * * * *